April 11, 1961  C. R. ROCKRIVER  2,978,974
RECIPROCATING COFFEE BREWER

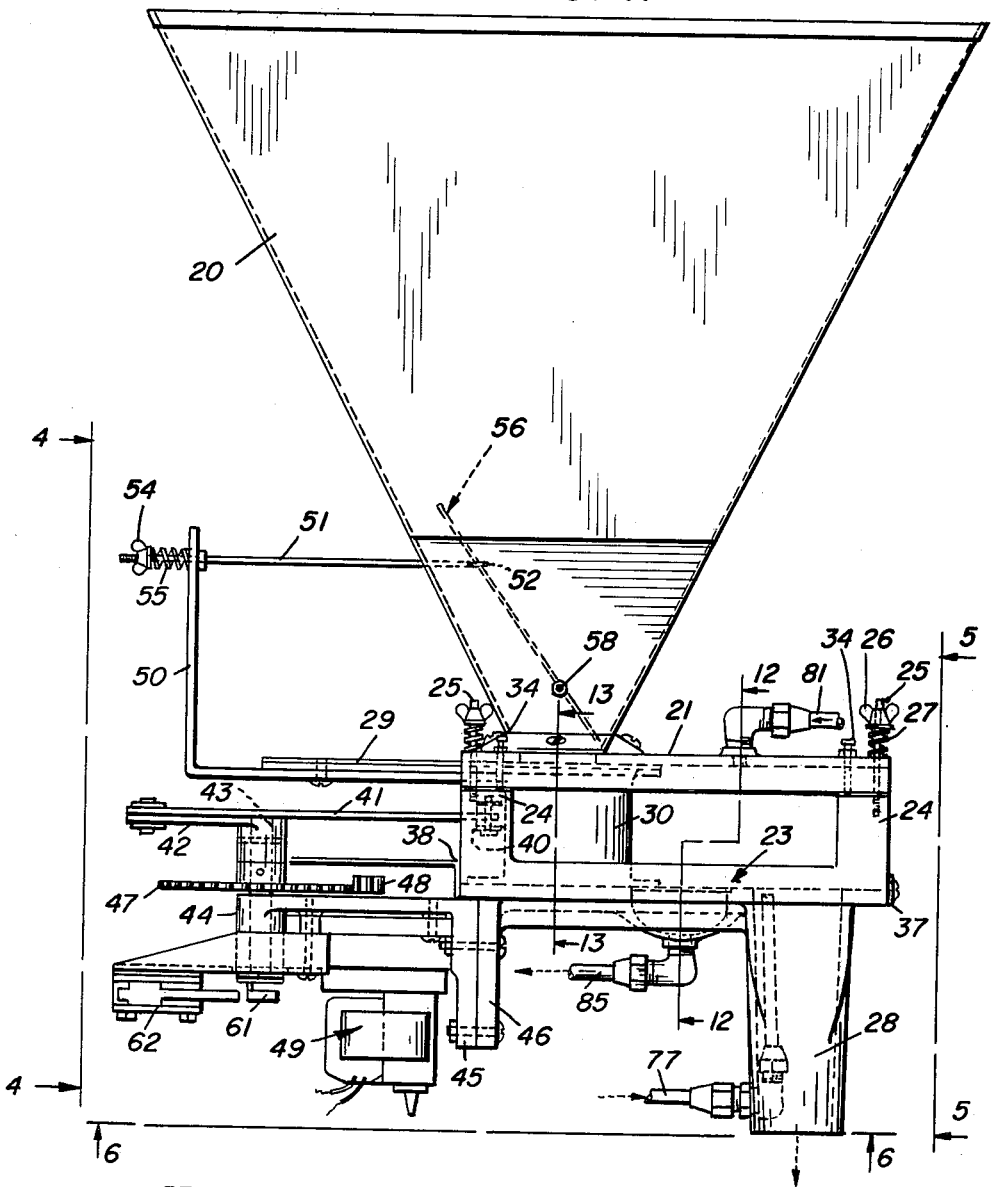

Filed Dec. 9, 1958  7 Sheets-Sheet 2

INVENTOR
CLYDE R. ROCKRIVER
BY
Albert J. Fike
ATTORNEY

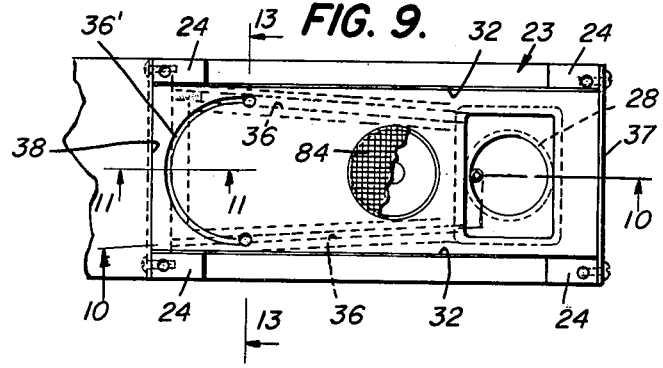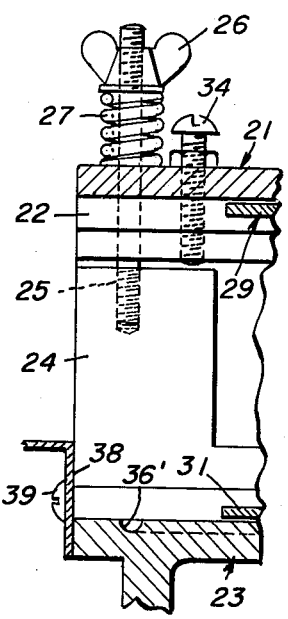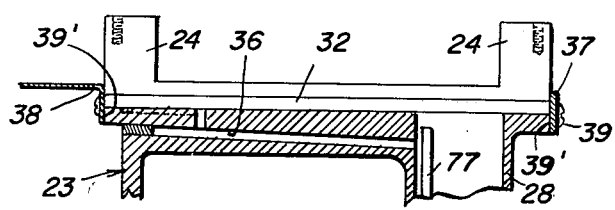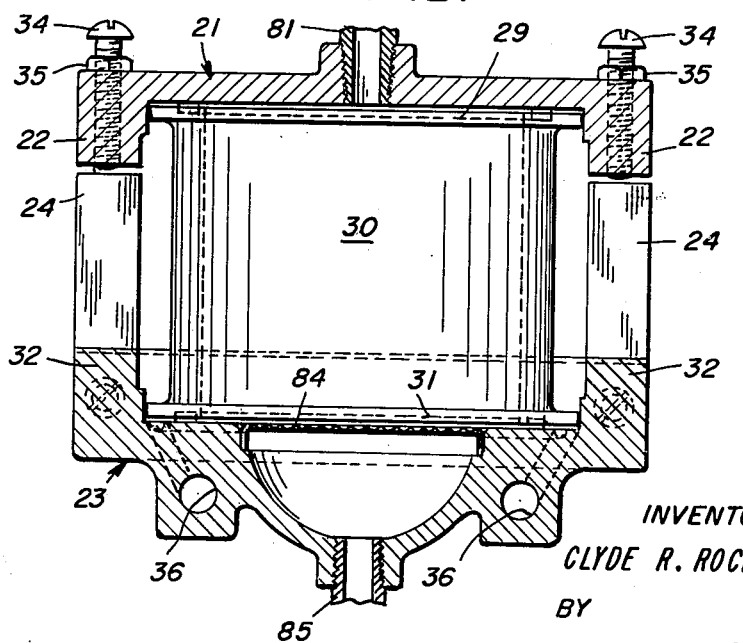

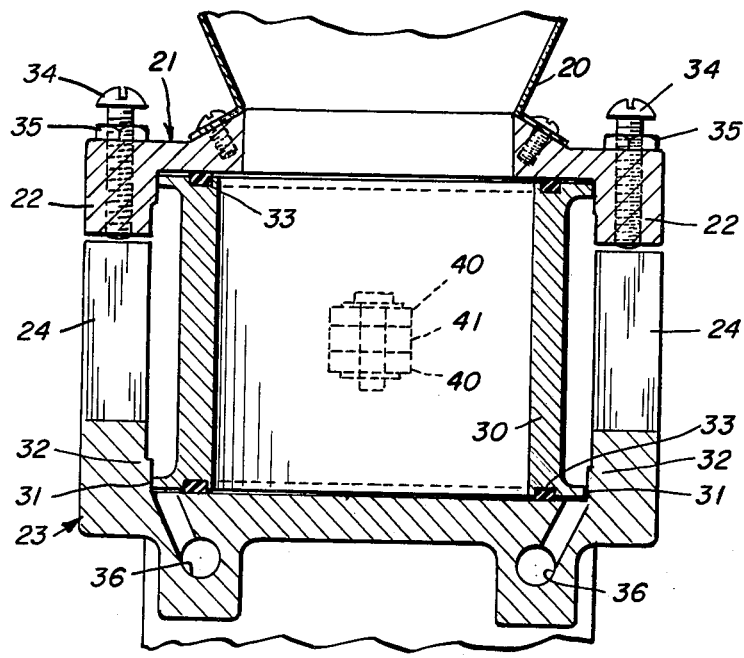
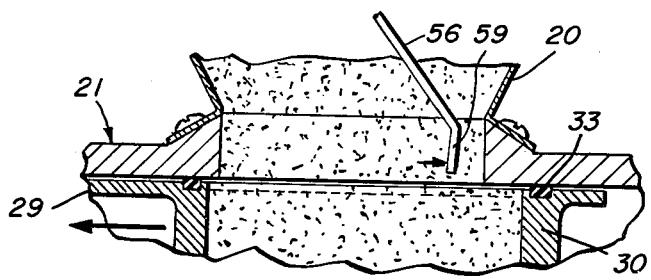
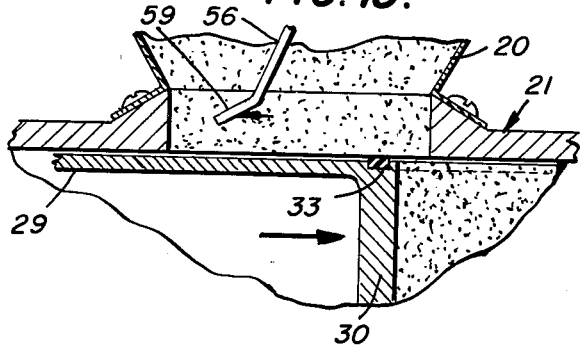

April 11, 1961 — C. R. ROCKRIVER — 2,978,974
RECIPROCATING COFFEE BREWER
Filed Dec. 9, 1958 — 7 Sheets-Sheet 5

INVENTOR
CLYDE R. ROCKRIVER
BY
Albert J. Fihe
ATTORNEY

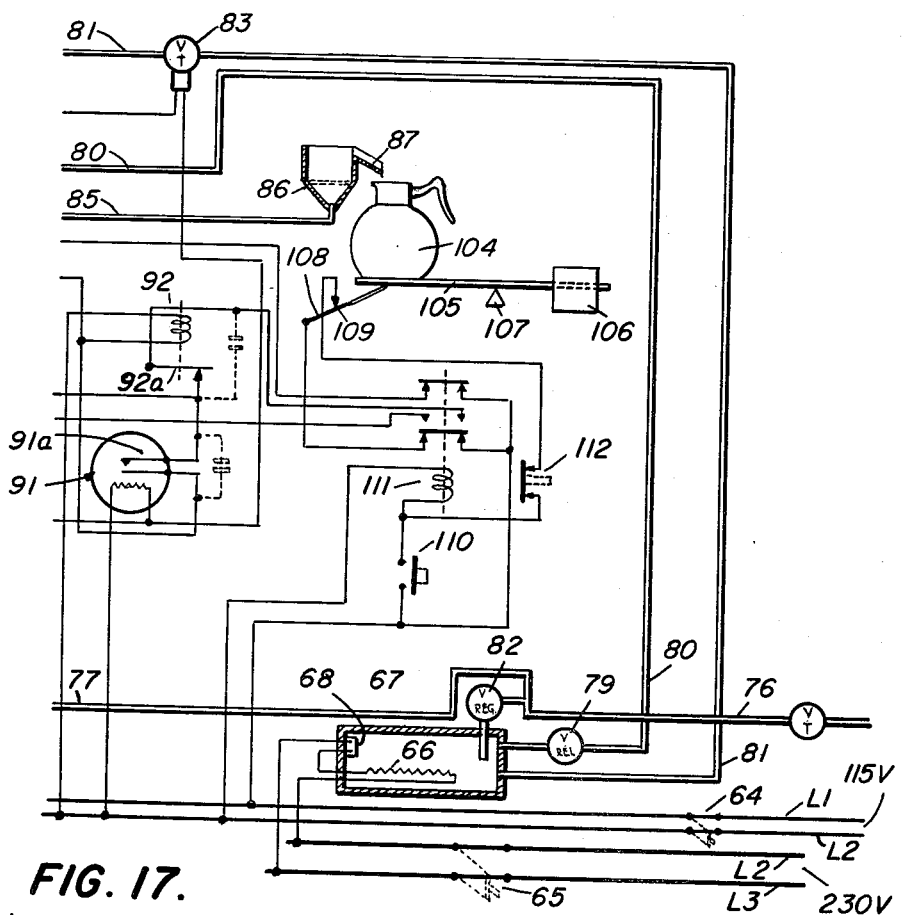

April 11, 1961

C. R. ROCKRIVER 2,978,974

RECIPROCATING COFFEE BREWER

Filed Dec. 9, 1958

INVENTOR
CLYDE R. ROCKRIVER
BY

ATTORNEY

United States Patent Office 2,978,974
Patented Apr. 11, 1961

2,978,974

RECIPROCATING COFFEE BREWER

Clyde R. Rockriver, Burbank, Calif., assignor, by mesne assignments, to Coffee Equipment, Inc., Los Angeles, Calif., a corporation of California Filed Dec. 9, 1958, Ser. No. 779,147

12 Claims. (Cl. 99—283)

This invention relates to a reciprocating coffee brewer, and the present invention comprises an improvement over two of my earlier inventions, one entitled "Coffee Brewer," application for U.S. Letters Patent on which was filed on December 3, 1956, Serial No. 625,871, now Patent No. 2,898,843, issued August 11, 1959, and the other entitled "Automatic Coffee Maker," Serial No. 655,991, filed April 30, 1957, now abandoned.

One of the important objects of this invention resides in the provision of an automatic coffee brewer, wherein a reciprocating self-alining slide element comprises one of the main features of the apparatus in that, in its cycle of movement from one extreme to the other and back again, it will receive a load of freshly ground coffee, move to a brewing station, remain at that station until a pre-determined amount of coffee has been brewed under pressure, then move to an emptying and rinsing position, remaining at this position until the rinsing cycle is complete, then automatically repeating these operations until a pre-determined amount of brewed coffee is in a reservoir, at which point the brewer is held in the emptying and rinsing position until a certain amount of coffee has been withdrawn from the reservoir. The brewer will then again make one or more complete cycles, replacing the coffee so withdrawn.

One of the important features of this invention is to provide, in a reciprocating coffee brewer, a hopper for ground coffee, which hopper contains an agitator for assuring delivery of a proper, pre-determined amount of ground coffee to the brewing element, which agitator is arranged to provide a downward force against a reciprocating slide element on the forward loading stroke, and an upward lifting force on the return stroke, and which agitating device is connected to the reciprocating element so as to operate simultaneously and contiguously therewith.

Another object of the invention relates to the provision of a motor-driven apparatus for brewing coffee and delivering the brew to a container for dispensing, which apparatus is equipped with coordinated timing switches for controlling the operation thereof, and which render the operation sure, safe and foolproof, regardless of conditions which might occur within the apparatus itself or any eventualities which might arise during operation.

Another and further important object of this invention is to provide, in combination with the brewing apparatus, thermally controlled switches and relays, whereby proper operating temperatures are maintained at all times for both the hot water supplied for the brewing operation and the finished brew at the delivery faucet.

Yet another object resides in the provision of a storage tank for completed brew, which is of sufficient capacity to assure a constant supply of freshly brewed coffee at all times, so long as the hopper contains a supply of ground coffee and so long as water at the proper pressure is available.

Another and still further important object of the invention relates to the combination of a delivery means and a storage tank for completed brew which will automatically stop the brewing operation when the reservoir is filled and which will, furthermore, act to delay the operation of the brewing means if the supplemental delivery tank cannot unload to the reservoir because the same is full.

Another important object of the invention is to provide, in combination with a reciprocating type of coffee brewing apparatus, means for automatically filling a dispensing container with freshly brewed coffee, in combination with means for automatically stopping the brewing operation when the dispensing container is filled.

Other and further important objects of the invention will be apparent from the disclosures in the accompanying drawings and following specification.

The invention, in a preferred form, is illustrated in the drawings and hereinafter more fully described.

In the drawings:

Figure 1 is an elevation, partly broken away, showing the hopper and the reciprocating brewing element of this invention. Some operating parts are shown in dotted lines.

Figure 2 is a perspective view of the control rod for a ground coffee agitator, which is positioned in the hopper for assuring prompt and measured quantities of ground coffee to the brewing element.

Figure 3 is a perspective view of the agitator which is positioned inside the hopper and which is operated by the device of Figure 2.

Figure 9 is a plan view of the main casting or frame of the reciprocating coffee brewer of this invention, showing certain essential interior passages in dotted lines.

Figure 10 is a longitudinal section, taken, on the line 10—10 of Figure 9, looking in the direction indicated by the arrows.

Figure 11 is an enlarged section of a portion of the structure of Figure 9, taken on the plane of the line 11—11 of that figure.

Figure 12 is an enlarged section on the broken line 12—12 of Figure 1, looking in the direction indicated.

Figure 13 is also an enlarged section on the line 13—13 of Figure 1 and the same section on the line 13—13 of Figure 9.

Figure 14 is a sectional view of the lower portion of the hopper and adjacent parts showing the agitator which assures proper filling of the slide compartment by ground coffee.

Figure 15 is a view similar to Figure 14, but showing the related parts in a different operating position.

Figure 17 is a graphical showing of the cycle of operation.

Figure 18 is a view, partly in section, of the upper portion of the reservoir for brewed beverage and its tiltable filling tank, and illustrates these parts as associated with a special control switch.

Figure 19 shows a modified form of the invention,

As shown in the drawings:

Figure 4:
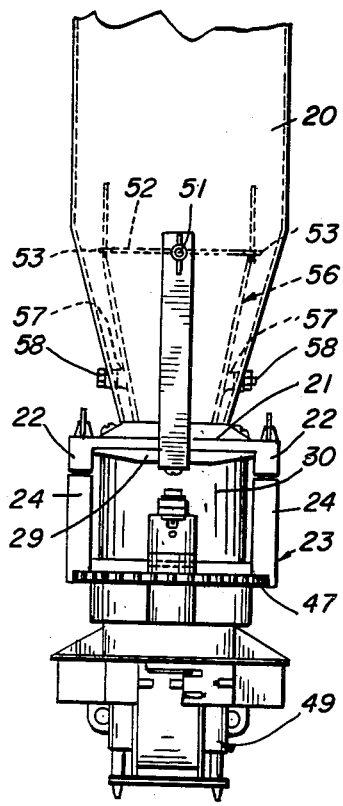
Figure 4 is an end view, taken on the plane of the line 4—4 of Figure 1, looking in the direction indicated by the arrows.
Figure 5:
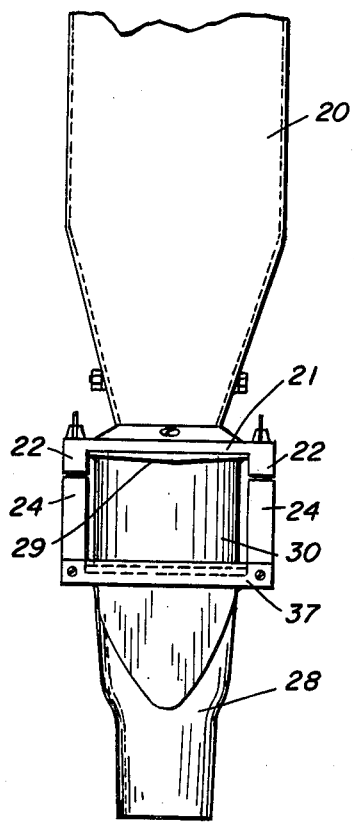
Figure 5 is an end view, certain parts being omitted, taken on the plane of the line 5—5 of Figure 1, looking in the direction indicated.

The reference numeral 20 illustrates generally a hopper of more or less conventional form, which is employed with the reciprocating coffee brewer of this invention. This hopper is suitably mounted on a support 21, which is in the form of a rectangular plate, having integral downwardly depending side flanges 22 (Figure 12).

This supporting plate 21 surmounts and is fastened to a main body portion 23 (Figure 1) which is of the same shape and area as the plate 21 and has an integral upright 24 at each corner. Each upright is drilled and tapped to receive a bolt 25 (Figure 11), which bolt passes through a corresponding opening in the corner of the plate 21, and upon the upper end of each bolt is mounted a winged nut 26 which operates against a spring 27, whereby self alinement at the brewing station is accomplished, and whereby suitable pressure adjustment and sealing connection is made between the base plate 21 and the main casting or body 23 (Figure 11).

This body portion 23 preferably also includes an integral downwardly extending pipe or spout 28 which is provided for the disposal of spent coffee grounds.

A slide plate 29, having a cylinder 30, either fastened thereto or integral therewith, operates against the underface of the plate 21, and the lower end of the cylinder 30 operates against the upper face of the lower portion of the main casting or body portion 23, all as best shown in Figure 12. The lower end of the cylinder 30 is provided with an integral flange 31, which rides on the upper face of the bottom of the main casting 23 and extends completely across the interior of the same, contacting the inside faces of upwardly extending ledges 32 which form an integral part of the body 23 and connect the uprights 24.

The slide plate 29, as best shown in Figure 15, also functions to retain the ground coffee in the hopper 20 while, at the same time, operating as a valve to allow refilling of the cylinder 30 for the initiation of a subsequent brewing operation.

Suitable sealing elements 33 to prevent leakage are provided in grooves in the upper and lower faces of the cylinder 30, all as best shown in Figure 13, and gap limiting adjusting screws 34 are mounted in the corners of the upper plate 21 adjacent the bolts 25, winged nuts 26 and springs 27 (Figures 1 and 13). These gap limiting adjusting screws 34 are provided with lock nuts 35, so that once an adjustment is made, the correct operating relationship between the parts will always be maintained.

The sealing elements or gaskets 33 will, during operation, act to provide a wiping action between the upper inner face of the case 23 and the under face of the cylinder or cup 30, whereby these parts are maintained clean and dry at all times. These sealing rings or gaskets also provide an actual bearing surface between the relatively moving parts.

As a guard against possible leakage, metal dams 37 (Figure 10) are fitted on the lower end faces of the casting 23, held in position by bolts 38, and the joints filled with cement 39.

It will be noted that the dam 38 is L-shaped and extends horizontally away from the casting 23 to provide a shield or guard against possible drippings or coffee dust which might otherwise contact the motor and current-carrying switches which are mounted below this shield.

As best shown in Figures 1 and 13, a pair of bosses 40 is formed integral with the outer face of the cylinder 30, and a link 41 is pivotally connected to these bosses, with its outer end pivoted to the corresponding outer end of a crank 42 mounted on a shaft 43 rotatable in a bearing 44, forming part of an L-shaped bracket 45 fastened to a juxtaposed integral extension 46 of the main casting 23, all as best shown in Figure 1. This shaft 43 has a gear 47 mounted thereon, which is in mesh with a smaller gear 48 fixed on the end of a shaft driven by a motor 49, which motor is fastened to the under face of the horizontal part of the bracket 45.

Bolted to the under face of the slide 29, which is connected to the cylinder 30, is an L-shaped bracket 50, with its outer end extending upwardly to support a rod 51, which rod passes through an opening in the adjacent face of the hopper 20 and terminates in a cross bar 52, having loops 53 at its ends (Figure 2).

A winged nut 54 maintains the outer end of the rod 51 in position in an opening in the upper end of the bracket 50, and a cushioning spring 55 is provided at this connection, whereby suitable adjustment for operating pressure can be had.

A yoke 56 (Figure 3), having bearing spindles 57 and shaped as shown, is pivotally mounted on a supporting shaft 58 fixed in the sides of the hopper 20 and extending transversely thereof. This yoke terminates in a cross bar or pusher 59, which moves across the hopper outlet when the slide 29, with its bracket 50 and the connecting link 51, is operated because of movement of the link 41 and the cylinder 30 caused by rotation of the motor 49 and the connecting gears. This assures delivery of exactly the same amount of coffee to the cylinder 30 at each operation (Figures 14 and 15).

As best shown in Figures 14 and 15, the pusher blade 59 will move from left to right as the slide plate 29 and the cup 30 is approaching the end point of its travel from right to left. This movement forces ground coffee into the cylinder 30 by actually packing the same therein in predetermined measured quantities, maintaining uniform brew. When the slide plate 29, with the cup or cylinder 30, begins to reverse its movement after the cylinder has been filled with ground coffee, the agitator and pusher bar 56—59 will move from the position shown in Figure 14 to that illustrated in Figure 15 which loosens and stirs the ground coffee in the lower portion of the hopper, whereby the same will readily drop or flow into the cylinder 30 at the next loading stage of the operation. Ground coffee does not readily flow, and has a tendency to pack, even in a hopper such as here employed, but the stirring action provided by the pusher and agitator blade 59 eliminates any tendency to undesirable packing with resultant incomplete delivery.

Figure 6:
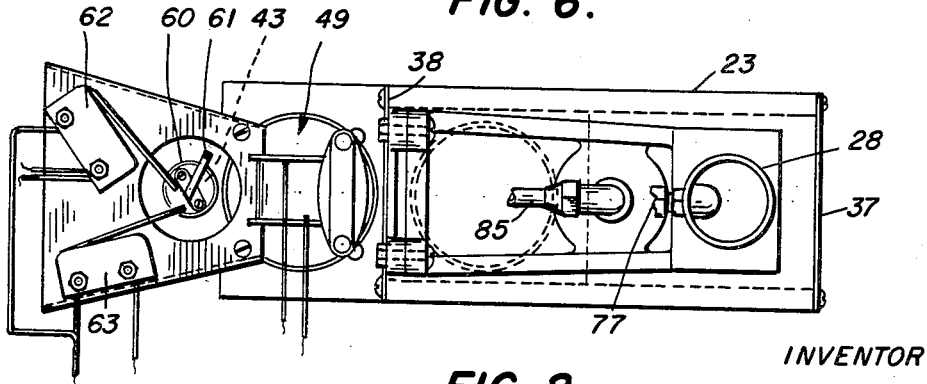
Figure 6 is a bottom view of the structure illustrated in Figures 1, 4 and 5, taken on the line 6—6 of Figure 1.
Figure 7:
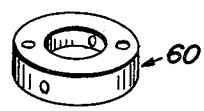
Figure 7 is a perspective view of the mounting for the element which operates the control switches.
Figure 8:
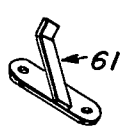
Figure 8 is a perspective view of the switch actuator which is supported by the element of Figure 7.

Referring now to Figures 6, 7 and 8, it will be noted that an actuating rotor 60 is mounted on the lower end of the gear shaft 43, and this supports a switch actuating arm 61 which, as the actuator 60 rotates due to operation of the motor 49, will successively contact arms of two micro-switches 62 and 63. In the schematic and diagrammatic showing of Figure 16, the switch 62 is designated as the brewing switch and is normally closed. The switch 63 is designated as the rinse switch and is normally open at the conclusion of a brewing cycle which is also the normal position of the entire apparatus.

Figure 16:
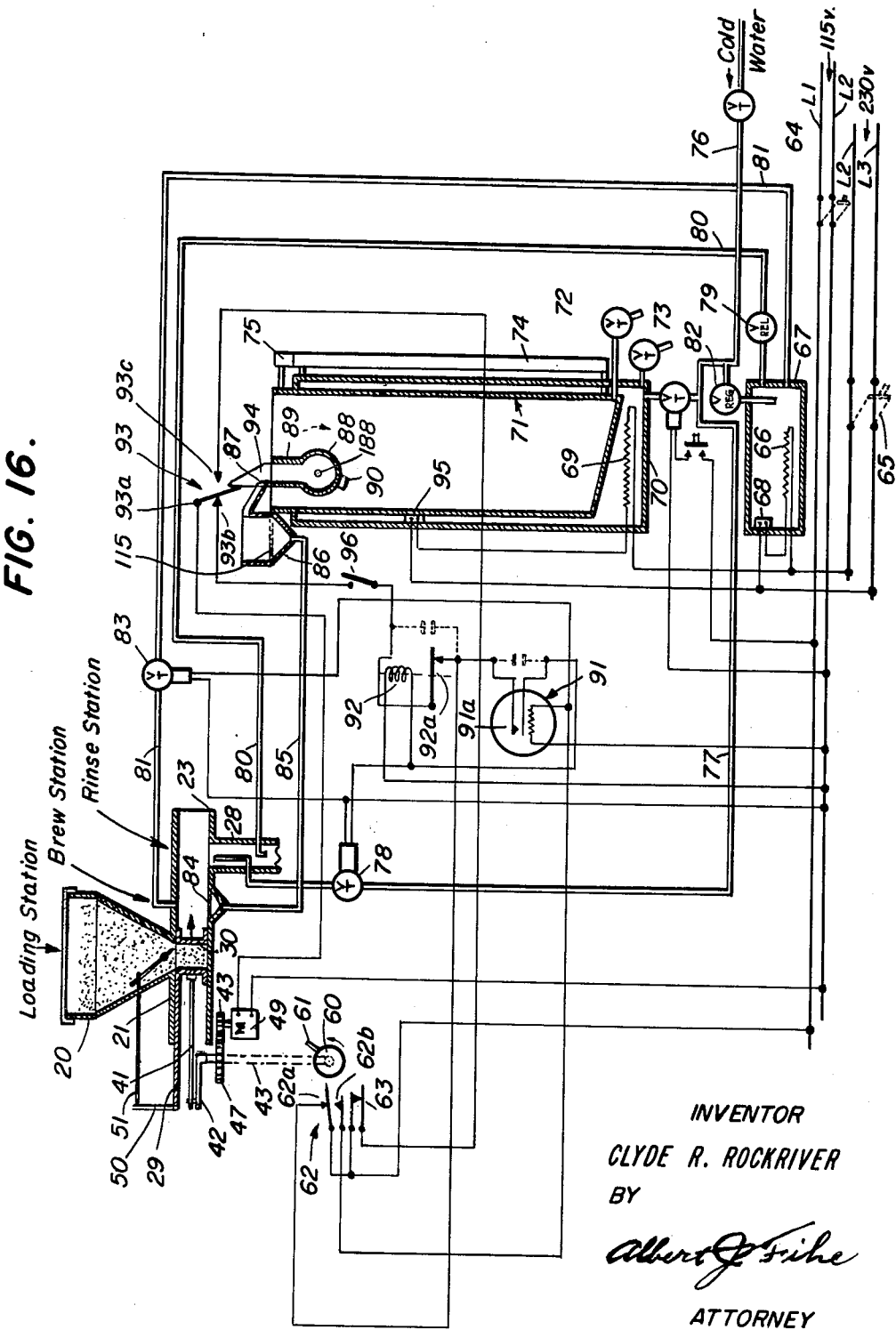
Figure 16 is a diagrammatic view, illustrating the main operating parts of the invention, more or less schematically, and in conjunction with a wiring diagram and feed water connections.
Figure 20:
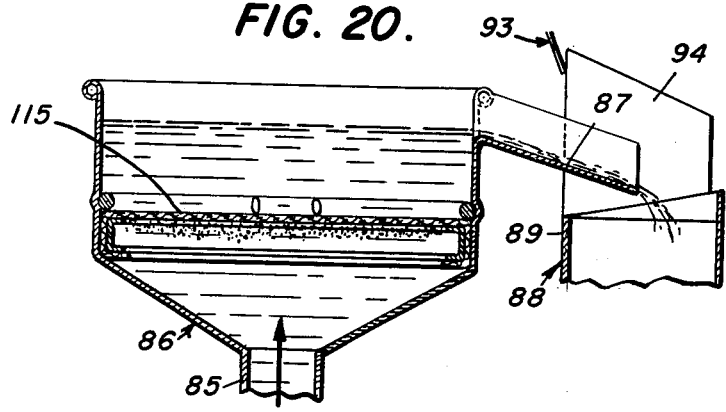
Figures 20 and 21 show details of the filter and delivery funnel.
Figure 21:
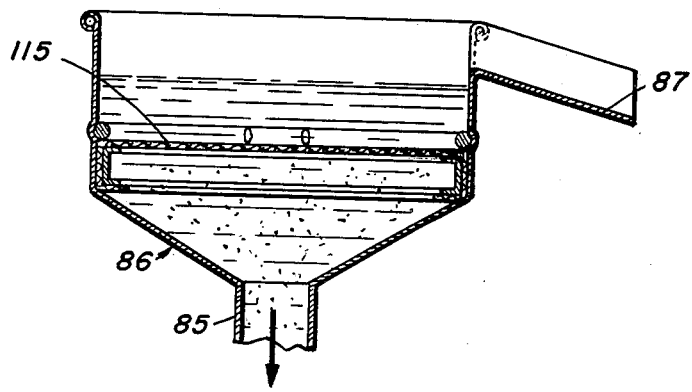

In operation, current for the motor 49 is normally supplied by an ordinary 115-volt line controlled by a main switch 64; and another line, preferably of 230 voltage, is included in the operational structure, and this is controlled by a switch 65, all as best shown in Figure 16. The higher voltage line is for the purpose of furnishing current to a heating element 66 in a hot water tank 67, this being controlled by a thermostat 68. This 230-volt line also furnishes current to a heating element 69 in a hot water jacket 70, controlled by a thermostat 95, which jacket has inside it a container 71 for completed brew. The container 71 is provided with a dispensing faucet or valve 72, and hot water may also be drawn from the outer jacket 70 by means of a faucet 73. Each of the jacket 70 and container 71 is provided with a sight glass, as shown at 74 and 75, respectively, so that the level of both the brew and the hot water can be determined at a glance.

Cold water is supplied from an inlet pipe 76, which delivers to both the water heater tank 67 through a pressure regulator 82, and by means of a further pipe 77 to a rinse valve 78. A solenoid to control valve 78 is in the pipe 77 just ahead of its outlet in the drain spout 28, and a pressure relief valve 79 is in a pipe 80 leading from the hot water tank, which pipe also exits at the drain 28.

Water, at a pre-determined brewing temperature, leaves the tank 67, via a pipe 81, and a brew control valve 83. This last valve is adjacent the exit of the pipe 81 at the brewing station of the main casting 23.

After the motor has been started, with the cylinder 30 in its initial rinse position, further rotation of the gears, crank and link 41 will move the cylinder 30 to the left, to the load position, as shown in Figure 16. After loading, the cylinder will return to brewing position and will stop there, because the switch actuator 61 will open the switch 62a, which opening is timed to stop the movement of the cylinder 30 beneath the outlet of the hot water pipe 81 and above a stainless steel filter screen 84 in the base casting 23. At the same time, the solenoid controlling the valve 83 is operated by closing of switch 62b, by arm 61, allowing hot water to flow into the ground coffee in the cylinder 30 and thence out through the screen 84 to a pipe 85 leading to a filter container 86, having a delivery spout 87, which terminates adjacent an opening in a cylindrical tank 88 horizontally and rockably positioned about supporting pivot 188 in the top of the brew container 71. This cylinder 88 is provided with an upper longitudinal housing or extension 89 and has a weight 90 attached to its under face at an off-center point. The proportions of the measuring cylinder or tumble tank 88, its upper extension 89 and the weight 90 are such that, when the tumble tank becomes filled with brewed coffee from the spout 87 of the filter 86 connected to the main brewing element, gravity will cause it to turn in a clockwise direction, as shown by the arrow in Figure 16, and deliver its contents into the container 71, where the brewed coffee is maintained at a proper temperature.

The brewing operation is continued until such time as the brew container 71 is completely filled and the tumble tank 88 cannot deliver any more brewed coffee (Figure 18). The brewing switch 93b to the motor will then be opened, stopping further operation until such time as the level of the brew in the container 71 drops to a point where the tumble tank can empty itself and again deliver freshly brewed coffee, at which time normal operation will be automatically resumed.

An extension 94 is fixed to the top of the cover of the tumble tank 88 (Figure 18), and this extension comprises an actuator for a double-pole, single-throw microswitch 93 mounted adjacent the normal uppermost position of the element 94. It will be noted (Figure 16) that, when the tumble tank 88 is in its normal vertical position, the switch contacts 93a and 93b are closed, completing a circuit to the motor 49. However, when the tumble tank is in its emptying position, as shown in Figure 18, the contacts 93a and 93b open, but circuit is then completed between the contacts 93a and 93c of the switch 93, which carries current from the contact 93c through the switch 63, which is closed at that juncture, and back to the main current-supply line, thereby again starting the motor, which will move the container 30 to the dump or rinse position above the drain pipe 28, where it will stop, because the actuating arm 61 will, at that point, open the switch 63, but simultaneously the valve 78 in the rinse water line will open.

The normal starting position of this equipment is what might be termed the rinse position, when the cylinder 30 is above the drain pipe 28. At this point, all current to the motor is shut off, and there will be no operation, until the main operating switch 64 is closed and the switch 93 is closed. When action commences, the cylinder 30 is moved to the left, where it is loaded, as previously described. It then moves to the brew position under the hot water inlet pipe 81. The cylinder is held in that position until brewing is completed, when it again moves back to the starting point over the rinse pipe 28.

This holding action at the brew position is maintained until such time as the tumble tank 88 is filled, whereupon it tilts, delivering its contents to the reservoir 71 and opening the switch contacts 93a and 93b. During the brewing operation, current is simultaneously supplied to a thermal delay switch 91 which, when heated, closes contact 91a. During this time, switch 62a is open, but switch 62b is closed, supplying power to open the brew valve 83, and, at the same time, supplying current to the heating element of thermal delay switch 91. Heating of thermal delay switch closes contact 91a. When thermal delay switch heats up, closing switch 91a, current flows through relay coil 92, opening switch 92a. Switch 91a will remain closed so long as the thermal delay is heated. When tumble tank empties, current is broken between 93a and 93b, but closed between 93a and 93c, supplying power through switches 63 and 62 to the motor, which then moves the cylinder 30 to the rinse position. As the actuator 61 leaves the arm of micro-switch 62b, it will close switch 62a, stopping supply of current to brew valve 83, closing the same, and also shutting off the power to heating element of thermal delay switch 91, allowing same to cool. Power then is supplied through switch 62a to the motor through 63, which moves the cylinder 30 to the rinse position and stops the motor by opening switch 63. During this operation, when actuator arm 61 leaves switch 62b and closes switch 62a, power is supplied through relay to the closed switch 91a, carrying current to relay 92, which opens switch 92a and supplies power to rinse valve 78, allowing water to flow through pipe 77 for washing out exhausted coffee grounds. This operation continues until heating element of 91 cools sufficiently to open switch 91a when further operation ceases. Meanwhile, switch 92a of relay 92 will again be closed, setting up conditions for a repeat operation, but not until rinsing is complete and the tumble tank has emptied and returned to vertical position.

A thermally controlled delay switch 91 is in the line leading to the brew controlled valve 83, as is also a further relay 92. These elements control the rinse or washing time and cause the relay 92 to hold open the circuit to switch 93 and switch 62, preventing the brewing cycle from starting until the rinse operation is complete. When the tumble tank evacuates the brewed coffee into reservoir 71, it will return to upright position, as shown in Figure 16, closing the switch 93a and 93b, and this action will operate to again start the motor, upon which the cylinder 30 will be moved to the extreme right of its operating position in the case 23, and exhausted coffee grounds will drop into and through the waste pipe 28. At this juncture, the rinse valve 78 is opened by its solenoid, also controlled by the delay 91 and the switch 62, whereupon cold water will be sprayed into the cylinder 30 which is, at that time, at rest; and all waste coffee grounds will be thoroughly washed out of it and down the drain.

In actual design of the equipment of this invention, the filter unit 86 is positioned at a level lower than the level of the brewing unit, and particularly the cylinder 30. The showing in Figure 16 is simply diagrammatic and is not restricted to either dimensions or relative location of the parts. Therefore, following a stoppage of any brewing operation, all liquid remaining in the filter funnel or container 86 will drain back through the filter cloth 115 through the pipe 85, the screen 84 at the brewing station and thence through the drain passages 36, exiting at the waste pipe 28. It will be apparent that during brewing a certain amount of fines will collect on the under face of the filter cloth 115, but when the last part of the completed brew remaining in the filter container 86 and above the filter 115 drains back through the filter due to gravity, these fines or mud will be removed from the under face of the filter and drained away. The latter portion of the brew is usually mostly water, so no appreciable loss will occur, while at the same time the continuous cleansing operation assures of a longer life of the filter cloth and a better flavor of the brew at all times. During the brewing process, the brewed coffee is first strained through the primary material filter 84, then passes through the pipe 85 into the lower section of the funnel shaped filter 86, and all the fines are collected beneath the filter 115 gradually creating a back pressure, resulting in brewing under pressure, as a result of which all the desirable ketones and esters are extracted from the ground coffee. The final, clear brew is distinctively palatable and flavorable, and is completely free of undesirable fines, enabling the brewed coffee to be held in perfect condition for a greater length of time.

The filtering device is preferably funnel shaped and the filter cloth 115 is double, having a retainer ring about its periphery. This cloth collects practically all of even the small microscopic fines and grounds on its under face during the brewing operation, and the automatic washing or cleaning operation following each brewing step eliminates the necessity of frequent cleanings and changes, while at the same time providing a coffee free of sediment.

As graphically illustrated in Figure 17, the cycle of operation, beginning at point 100, which is the rinse position, will first move the brewing cylinder 30 to position 101, which is less than one-half the cycle, and which is the loading station. Further operation continues unbroken until the cylinder arrives at the brewing station 102, at which point the motor is stopped and is not again started until the tumble tank 88 is filled with a predetermined amount of brewed coffee and empties itself. When the tumble tank dumps, the motor is again started, and at point 103 the actuator arm 61 leaves switch 62b closing brew valve 83 and opening rinse valve 78 by way of thermal-delay unit 91. At point 103, rinse valve 78 is opened and allows cold water to begin to wash out the container 30. This washing operation, together with movement of the container 30, continues until the starting point 100 is again reached and the mechanism stops. However, some rinsing operation continues through the still open valve 78 until the thermal-delay heating element has sufficiently cooled to open switch 91a. In the event that the tumble tank 88 is in a non-dumping position at the cessation of movement of the cylinder 30, and then because of withdrawal of brewed coffee from the container 71 again moves to a vertical position, closing the switch 93a—93b, the relay switch 92a will still be open, preventing inadvertent starting of the motor.

In the modification shown in Figure 19, the reservoir 71 and tumble tank 88 are eliminated and delivery of brewed coffee is made directly to a manually operated portable container 104. This is positioned beneath the delivery trough 87 and seated upon a weighted platform or scale 105, whereby, when it is approximately full, the platform, with its counter weight 106, will tilt about a fulcrum 107, opening the counter part 108 of the switch 93a—93b of Figure 16. At the same time, counter part 109 of switch 93c is closed, effecting the same cycle of operation through thermal-delay switch 91 and relay 92 as previously described.

A push button switch 110, connected to a relay 111 in the main 115 volt supply line, is inserted adjacent the tilting platform 105. This switch is operated by a push button 112, which push button is the counterpart of the switch actuator 94 of the tumble tank 88. In other words, when the push button 112 operates the relay 110, a connection is made by way of a holding switch 113 to the tilting platform switch 108. When the container 104 is filled, electrical connection is broken at 108 and made at 109, but current to the relay 111 is shut off, opening the switch 113; and the parts remain in this position until the push button 112 is again manually operated.

It will be evident that herein is provided a coffee brewer which is relatively simple of construction, automatic in operation, is not prohibitive in cost, can be easily maintained in proper working order, because it is composed of a minimum number of parts, and the tendency for unskilled, unauthorized or simple inquisitive tampering is reduced to a low point.

The water pressure, temperature and flow are controlled within close pre-determined limits, the brewing operation can be preliminarily timed for a desirable resultant strength of coffee to be served, the removal of spent coffee grounds is complete and automatic, and the reservoir or container for brewed coffee is constantly maintained at a maximum level and at a desired proper coffee serving temperature.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

1. A reciprocating coffee brewer, comprising, in combination, a hopper for ground coffee to be brewed, a support for the hopper, said support comprising a hollow casing, a measuring slidable brewing container for ground coffee reciprocable in the support at the bottom of the hopper, operating means for successively, intermittently and repeatedly moving the container through three operating stages; namely, a loading stage, a brewing stage and a rinsing stage, said operating means comprising a motor, a crank on a shaft driven by the motor in the support, a link connecting the crank to the measuring container, automatically timed switches in the motor circuit, a switch actuator mounted on the crank shaft, a water heating tank, a reservoir for brewed coffee connected to the tank and means for maintaining the tank and the reservoir at pre-determined temperatures, said means including a water jacket, a thermally controlled electric heater in the jacket and automatic means for continually maintaining the contents of the brew reservoir at a maximum filled stage, said automatic means including a tumble tank positioned in the top of the reservoir.

2. A device as described in claim 1, wherein the tumble tank comprises an open cylinder rockably mounted in the reservoir, a weight at the bottom of the cylinder, a longitudinal trough-like extension at the top of the cylinder and a switch actuator at the top of the tumble tank.

3. A device as described in claim 2, wherein the upper extension of the tank has an orifice for reception of brewed coffee.

4. A device as described in claim 3, wherein a conduit connects the brewing container to the tumble tank at one phase of its movement, and wherein a filter means is in the conduit.

5. A device as described in claim 2, wherein a switch for controlling the operation of the motor is mounted adjacent the actuator on the tumble tank.

6. A device as described in claim 1, wherein conduits connect the water heating tank and the reservoir to the brewer.

7. A device as described in claim 6, wherein a solenoid operated valve is in the line connecting the water heater to the brewer, the solenoid being in the motor circuit.

8. A device as described in claim 1, wherein a source of water is provided for the brewer, said source leading to the water heater and also to the rinsing stage of the brewer.

9. A device as described in claim 8, wherein a solenoid controlled valve is in the cold water line leading to the rinsing stage of the brewer.

10. A device as described in claim 7, wherein a thermal-controlled relay is in the circuit leading to the brew valve solenoid.

11. A device as described in claim 1, wherein an agitator is in the hopper and links connect the agitator to the reciprocable container.

12. A device as described in claim 1, wherein a plurality of springs press the measuring slidable container into operative, nonleakable contact wtih the bottom of the hopper.

References Cited in the file of this patent

UNITED STATES PATENTS

| | | |
|---|---|---|
| 565,219 | Richards | Aug. 4, 1896 |
| 1,470,584 | Kreutz | Oct. 9, 1923 |
| 1,668,540 | McAllen | May 1, 1928 |
| 1,805,159 | Bauer et al. | May 12, 1931 |
| 1,869,720 | Strand et al. | Aug. 2, 1932 |
| 2,012,645 | Thomas | Aug. 27, 1935 |
| 2,014,325 | Grilli | Sept. 10, 1935 |
| 2,315,777 | Denton | Apr. 6, 1943 |
| 2,558,062 | Selzer | June 26, 1951 |
| 2,613,588 | Swanson | Oct. 14, 1952 |
| 2,827,845 | Richeson | Mar. 25, 1958 |

FOREIGN PATENTS

| | | |
|---|---|---|
| 515,285 | Italy | Feb. 14, 1955 |